Oct. 12, 1965 A. G. BODINE, JR 3,211,243
SONIC DRILLING BY ROTATING THE TOOL
Original Filed July 12, 1954 2 Sheets-Sheet 1
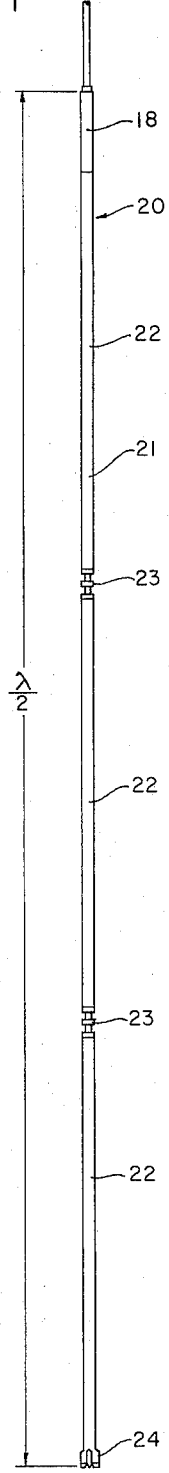
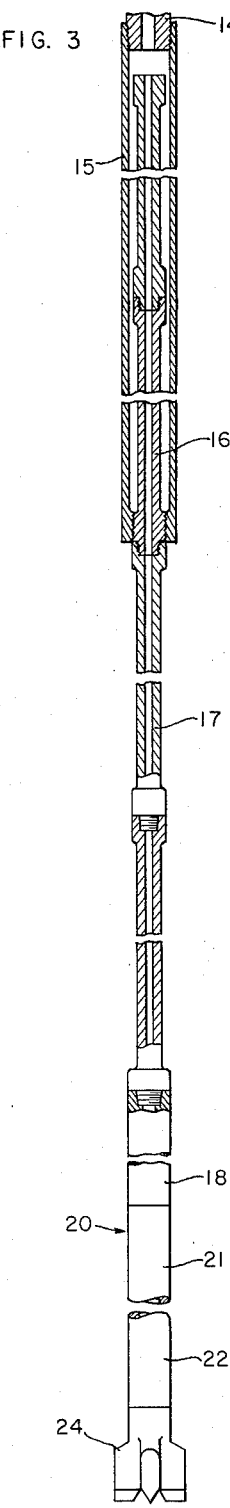
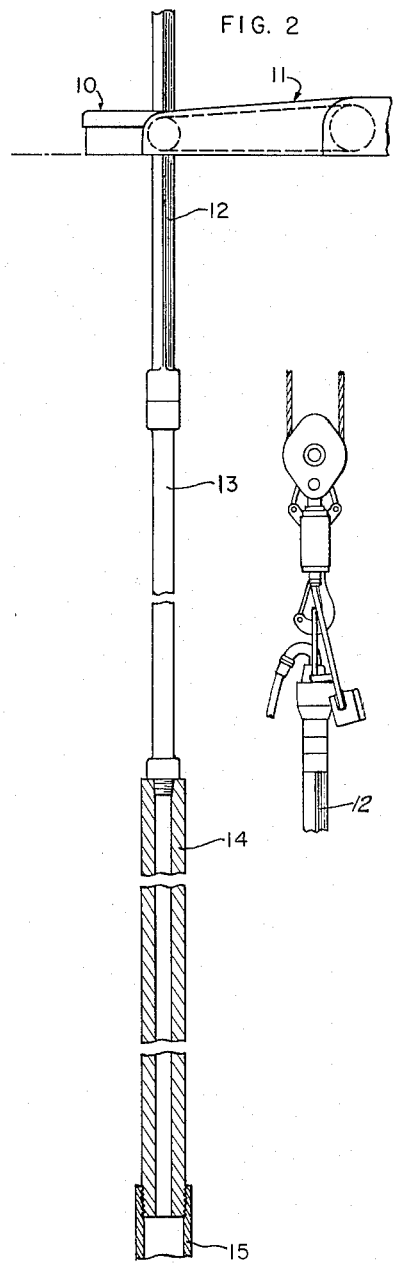
INVENTOR.
*Albert G. Bodine, Jr.*
*Attys.*

Oct. 12, 1965    A. G. BODINE, JR    3,211,243
SONIC DRILLING BY ROTATING THE TOOL
Original Filed July 12, 1954    2 Sheets-Sheet 2
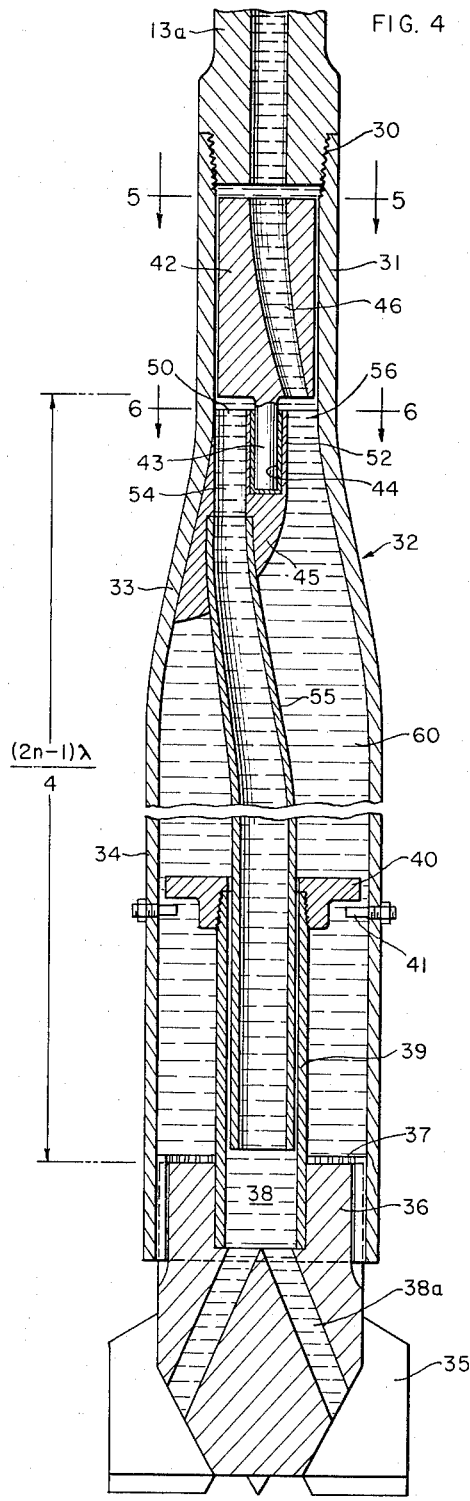
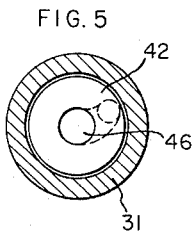
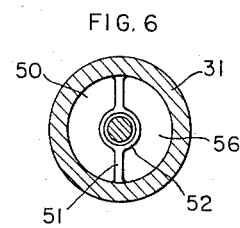
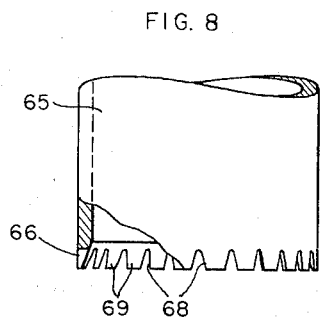
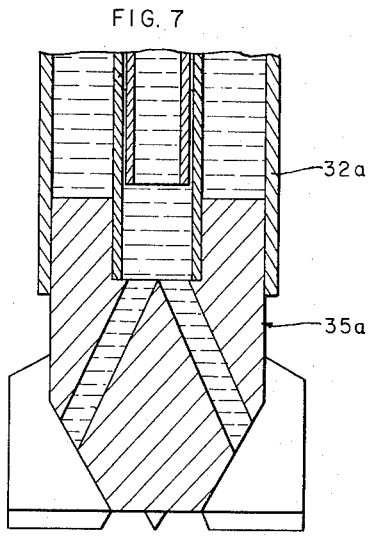
INVENTOR.
Albert G. Bodine Jr.
Atlas ३,२११,२४३
SONIC DRILLING BY ROTATING THE TOOL
Albert G. Bodine, Jr., 7877 Woodley Ave.,
Van Nuys, Calif.
Continuation of application Ser. No. 442,805, July 12, 1954. This application June 8, 1960, Ser. No. 34,805
18 Claims. (Cl. 175—57)

This application is a continuing application of my prior copending application Serial No. 442,805 filed July 12, 1954, now U.S. Patent No. 2,970,660 for Polyphase Sonic Earth Bore Drill, granted February 7, 1961; and all of the following applications also disclosed subject matter claimed in this application: My prior application Serial No. 739,313 filed June 2, 1958, was copending with my aforesaid application Serial No. 442,805, and is now U.S. Patent No. 2,942,849 for Method for Sonic Earth Boring by Use of Resonant Wave Pattern Transmitted From Ground Surface. My prior application Serial No. 225,828 filed May 11, 1951 (which was copending with my aforesaid application Serial No. 442,805) is now U.S. Patent No. 2,713,472 for Sonic Earth Boring Drill With Self-Resonating Vibration Generator, granted July 19, 1955. Said application Serial No. 225,828 was a division of my prior application Serial No. 200,277 filed December 11, 1950, now U.S. Patent No. 2,554,005 for Earth Boring Apparatus, granted May 22, 1951; which later application was a continuing application of my still earlier application Serial No. 697,235 filed September 16, 1946, for Earth Boring Tool, now abandoned. So far as claims reciting biasing the drilling element are concerned, this application has basis in said Serial No. 442,805 as aforesaid but not the earlier ones of the aforesaid applications.

This invention relates generally to the art of sonic boring, particularly, though not necessarily restricted to, sonic boring of the earth through rock formation, as exemplified in my Patent No. 2,554,005, and its general object is the provision of improvements in sonic boring affording materially increased rates of penetration.

Sonic boring of substances such as underground rock, as referred to herein, consists in vibrating a bit against the rock with great force but relatively small displacement distance, so as to place the formation under substantial periodic elastic stress, or stress reversals, the rock giving away under the bit primarily by reason of elastic fatigue failure. This process is described in detail in my aforesaid Patent No. 2,554,005, and typical sonic drilling apparatus is disclosed therein. In its basic or most usual form, a sonic drilling apparatus of the class referred to comprises one or more elastic drill collars coupled to the bit, and a vibration generator for setting up longitudinal elastic standing wave vibration in these collars with the lower end of these collars and the bit coupled thereto undergoing at typical lower operating frequencies a periodic stroke toward and from the formation up to ⅜″ or even ½″. At typical higher operating frequencies the stroke is typically of the order of 0.1 inch. The collars are usually suspended by a drill string from the ground surface. The formation, by reason of its own elasticity, vibrates with the bit, and, depending upon the elastic stiffness of the formation in any given case, may vibrate through a displacement distance approaching that of the bit. It is believed more usual, however, for bit amplitude to exceed formation amplitude somewhat, separating from the formation on each of its upstrokes.

In each of the above noted applications there are disclosed specific forms of my sonic drill which are attached to the bottom end of a conventional rotary drill pipe string and therefore are optionally rotated. In instances employing mud and drill pipe the drill assembly is rotated in the hole, while mud flow and drilling action is going on, in order to reduce the tendency for the drill cuttings to jam the tool joints. Moreover, such systems are operated with the rotary table turning in order to keep the conventional coarse-thread tool joints tightly screwed together, and to assuredly drill a straight hole in spite of inherent slight crookedness in the drill pipe string. In working in the field with various forms of my sonic drills I have discovered that rotary combinations i.e., various forms of sonic drill combined with rotation can give especially high drilling performance—more than would be expected from simply progressing the bit over the bottom of the hole. Pursuing the matter further with laboratory model investigation I found that the combination of rotary turning of the bit with the sonic action of my longitudinally resonant heavy elastic bar, results in a very surprisingly high performance. I believe this is due, at least in part, to a complex cyclic elastic stress being set up in the formation under the bit, as will be more fully described hereinafter. Aside from proposed explanations, however, it is important to note that the basic concept of this invention is simply combining rotary turning of the bit with the sonic action of my longitudinally resonant bar, as above stated. As above described, the basic advantages are realized from this combination.

In addition, I have discovered that in many instances a critical range of drill string rotation rate can be found within which bit penetration through the rock is materially increased. The phenomena involved in this effect were not immediately evident. Some performances and considerations from which the nature of the phenomena involved in the present process may be deduced are as follows: In my process, the rock is not conceived of as cut by bit rotation, and all evidence is to the effect that such cutting is not necessarily a part of the action. It appears, on the other hand, that the rate of bit rotation for optimum penetration rate in my process is correlated, for a given formation, with the average vertical velocity of the vibrating bit (stroke distance divided by half the vibration period). The optimum range of bit rotation rate according to this aspect of the invention is sometimes relatively low by rotary drilling standards, and very frequently when the critical range of bit rotation rate is exceeded the penetration rate decreases. If the increased performance were attributable to rotary cutting, penetration rate would not logically fall when a certain critical rate of rotation, still low by rotary drilling standards, is exceeded. The critical range of bit rotation rate, as well as the width of this critical range, depends considerably upon the particular formation being drilled. With some formations, this critical range can be fairly broad. Because of this dependency upon the nature of the formation, the critical range, or the optimum rate within this range, cannot of course be defined in terms of vertical bit velocity alone for all formations. However, my experience with the process of the invention suggests a correlation between bit rotation rate and vertical bit velocity for many formations, as aforesaid, further evidencing that the phenomena are related to the vibratory action of the bit in combination with critical rotation, and not to ordinary rotary cutting.

Bearing all of these above discussed considerations in mind, the phenomena of the invention is attributed, stated broadly, to an elastic torsion periodically set up in the formation under the bit, in relation to bit vibration, and the desired performance is attained when the bit is simultaneously rotated, which performance is ascertainable very readily simply by observation of penetration rate.

The phenomena in question also have a relation to total weight or bias on the bit, and, for many formations, a degree of bias can be found at which increased rate of penetration by rotation in a critical speed range is optimized. The optimum bias can vary with the nature of the formation. I have found that usually the bias should be great enough so that one may detect second harmonic frequency. This discovery shows that a desirable value of earth coupling of the sonic bit causes second harmonic in the elastic bar.

Best present theory for the understanding of the phenomena involved in the invention is as follows: With simultaneous bit rotation, the formation under the bit is substantially elastically twisted or placed under torque by the bit during each downstroke of the latter. Thus the blades of the bit, simultaneously rotating and moving downward against the formation, stress the formation both vertically and torsionally. On each upstroke of the bit, bit pressure is relieved, and the formation is permitted to twist back, or "unwind." The formation under the bit is thus subjected to a periodic torque, in step with extreme periodic vertical stress, peculiar to such sonic drills, in such a way as to develop periodic shear stresses therein. This periodic shear, in coaction with the vertically oriented periodic elastic stress, when made sufficient to exceed the endurance limit of the formation for shear stress, induces substantially increased fatigue failure of the formation under the bit. If the rate of bit rotation is too low, any assumed torque and shear stress is too little to be effective. In any event, no improvement is observable. If the rate of bit rotation is excessive, the bit may skid over the rock, and for this or other reasons, no improvement is gained. Downward bias on the bit apparently improves the extent by which the formation may be elastically twisted, presumably by lessening the tendency for skidding. Application of excessive bias reduces the amplitude of vertical bit vibration, and the drilling rate falls.

A sonic drill of the type utilizing a massive elastic longitudinally vibratory structure, e.g., the aforementioned elastic drill collars coupled to the bit, is of especial advantage in practicing the invention. Because of the longitudinal resonant standing wave set up in this structure, the system is afforded a high energy storage property, as explained more fully in my parent Patent No. 2,554,005. Because of this energy storage property, the drill, under the combined longitudinal and torsional sonic cycle, can deliver its combined stress resultant into the rock even though the bit is torsionally engaged therewith. The energy stored in the massive elastic structure is delivered to compensate any restraining action (wave damping) caused by torsional "locking" during the engagement interval.

Most of the above described advantages and improved results come from the basic combination of rotary turning of the bit with the sonic bar action, as also set forth above.

The invention will be more fully described in connection with forms of illustrative apparatus capable of carrying it into effect, reference for this purpose being had to the accompanying drawings, in which:

FIG. 1 is an elevational view of a sonic drill;

FIG. 2 is a view partly in elevation and partly in section showing a drill stem for a sonic drill, and, somewhat diagrammatically, the rotary table and draw works equipment at the ground surface;

FIG. 3 is a view partly in section and partly in elevation showing the sonic drill of FIG. 1, a vibration isolator, and a fragment of a drill collar of the drill stem above;

FIG. 4 is a longitudinal section through a hydraulic type of sonic drill;

FIGS. 5 and 6 are sections taken on lines 5—5 and 6—6, respectively, of FIG. 4;

FIG. 7 shows a modification of FIG. 4; and

FIG. 8 shows a modified type of bit.

With reference first to FIGS. 1–3, there is fragmentarily indicated, in FIG. 2, portions of ground surface drilling equipment, including a conventional rotary table 10, table drive 11 for driving the same, kelly 12 extending table 10, and conventional drill pipe string 13 coupled to kelly 12. The remainder of the ground surface equipment, such as conventional swivel and travelling block termination at the top of kelly 12 is shown in FIG. 2a, and may be as in my Patent No. 2,554,005, and will be understood to be that usually used in rotary drilling.

FIG. 2a shows a conventional upper termination of the drill string, for supporting kelly 12, above described. Conventional derrick cable 5 suspends traveling block 6 having hook 7, as in standard practice. A typical swivel 8 suspended from hook 7, then screw connects into kelly 12 in the conventional manner, and also carries the usual mud-hose gooseneck 9.

To the lower end of drill pipe string 13 may be coupled loading or biasing means in the form of one or more heavy drill collars 14, and to the lower end of the latter is screw-coupled a relatively long suspension sleeve 15 (see FIG. 3). The lower end of sleeve 15 is furnished with an internal screw-threaded coupling to the lower end of a relatively slender upstanding pipe column 16 reaching nearly to the lower end of collar 14. This pipe column 16 is here shown to comprise two intercoupled lengths of conventional drill pipe, suitable annular working clearance being provided between column 16 and sleeve 15. A slender pipe column 17, equivalent in length and cross section to the pipe column 16, is coupled to the lower end of pipe column 16 below the lower extremity of sleeve 15, and its lower end is coupled to oscillator or cyclic force generator and power unit 18 of the sonic drill. The pipe column 17 may also be composed of two lengths of conventional drill pipe, the lower end of the lower length being adapted for coupling into the larger diameter unit 18. The unit 18 comprises the upper component of the sonic drill assembly proper, designated generally by numeral 20. In addition to the oscillator or cyclic force generator and power unit 18, the drilling assembly 20 comprises an elastic column or rod 21, made up typically of three more or less conventional drill collars 22 connected to one another by conventional drill collar couplings 23 rigidly coupled at the upper end thereof to unit 18, and carrying at the lower end thereof a blade type bit 24. The individual drill collars 22 may be of conventional 40-foot lengths, and for a drill having a bit circle 10″ in diameter, the collars 22 may have an outside diameter of, for example, eight inches. The collars 22 are of good grade of alloy steel, and of course have the property of high elasticity, permitting a longitudinal standing wave to be set up therein under periodic longitudinal force application from unit 18.

The unit 18 may comprise a mechanical vibrator, typically in the form of a plurality of rotating eccentric weights, so arranged that while longitudinal components of vibration are additive, lateral components of vibration are canceled, powered by a turbine which is in turn driven by the stream of mud fluid circulated down through the drill string as in conventional rotary drilling practice. Suitable forms of such devices are described in my aforementioned Patent No. 2,554,005.

Assuming the sonic drill assembly 20 to have a length of approximately 120 feet, the resonant frequency for longitudinal half-wavelength standing wave vibration thereof is approximately 70 cycles per second. The force generator and power unit 18 is accordingly driven at such a speed as to apply a vertically oriented alternating force of a frequency of 70 cycles per second to the upper end of drill collar string 21. Half-wavelength standing wave vibration of the drilling assembly then takes place, and the bit 24 is vibrated vertically against the formation which it engages at the bottom of the bore hole. The double amplitude (stroke) of this vibration can be in the range of ⅜″ to ½″.

The assembly comprising sleeve 15 and pipe columns 16 and 17 forms an isolator, by which vibratory action of the sonic drill assembly is isolated effectively from the drill-string above, and is of a type disclosed in FIG. 3 of my Patent No. 2,903,242, issued September 8, 1959.

To function as such, the two pipe columns 16 and 17 each have a length equal to a quarter-wavelength for the operating frequency, or in other words, half the length of the sonic drilling assembly 20. In operation, with sonic drilling assembly 20 vibrating in its half-wavelength mode, the elastic pipe system made up of pipe columns 16 and 17 vibrates also, at the same frequency, in a half-wavelength mode, its lower end vibrating in consonance with the vertical vibration of the upper end of the sonic drilling assembly 20, its upper end vibrating equally and oppositely thereto, and its center section, where the two pipe columns 16 and 17 are intercoupled to one another, and to the lower end of suspension sleeve 15, standing substantially stationary. Sleeve 15 is somewhat flexible and elastic, and of substantially quarter-wavelength for the fundamental resonant frequency of the system. Accordingly, any small remaining vibration in the region where the pipe columns 16 and 17 are coupled to one another sets up a small quarter-wave mode of vibration in the sleeve 15. The massive drill collar 14 coupled to the upper end portion of sleeve 15 establishes a high mechanical impedance at that point, such that while sleeve 15 may vibrate slightly in a quarter-wavelength mode owing to any remaining vibration at the junction of pipe column 16 and 17, the coupling point between collars 14 and sleeve 15 functions as a highly rigid or massive anchorage, and transmission of any vibratory energy up to the collar 14 is reduced to negligible amplitude.

The isolator device just described, as well as the overall basic process of sonic drilling, are fully set forth in my aforementioned Patents Nos. 2,554,005 and 2,903,242, and need not be further described herein.

It was mentioned in the introductory paragraphs of the present specification that a feature of the present invention is a correlation of weight or bias on the sonic drill with rotation of the drill string. The string of drill collars 21, of course, contributes a substantial degree of weight. The collar or collars 14 above the isolator add further weight, and these can be used in numbers or lengths such as to provide the downward bias best suited to any given drilling situation. As an alternative, or along with use of collars 14, the string of collars 21 may be increased in length and therefore in weight. Thus, for example, the sonic drill may be designed for full wavelength vibration, instead of half-wavelength vibration, in which case the drill collar length is doubled for the same operating frequency. Moreover, one or more additional half-wavelength sections of collar may be added to the string 21.

In any given field situation, lengths of drill collar are selected in accordance with information as to type of formation to be penetrated, or with field experience at the site. In general, hard rock formations require greater weight on bottom, and gummy formations are penetrated best with less weight. The decision in this matter is up to the drilling crew, and while predictions can be made based on accumulated data, the best weight can generally be found by trial and error.

An illustrative practice of the invention is as follows: Assuming a selected drill collar weight, the drilling apparatus is rested on the hole bottom, the cyclic force generator is driven at the proper speed for resonant vibration of the system, causing the bit to vibrate against the formation, and the rotary table is slowly rotated, thereby correspondingly rotating the drill stem, sonic drill, and vibrating bit. By slowly increasing the rate of rotation from a standing or very slowly rotating start, while observing the rate of penetration of the bit, a range is frequently found at which the rate of penetration very noticeably increases. This range varies with different formations, as well as with different biasing weight, but is usually evident. As bit rotation is further increased beyond the point at which increased performance is first observed, the rate of penetration may increase still further; but with continuing increase in rotation rate, the rate of penetration sometimes markedly passes its maximum, and thereafter falls. The optimum has occurred, in my experience, with a sonic drill operating at 70 cycles per second, and in drilling one type of formation, in the range of two revolutions per second. The sometimes easily noted fall-off in penetration rate as rotation rate is increased beyond the optimum is more gradual than is the increase in penetration rate as rotation rate is brought up to the critical range.

As explained hereinabove, the increase in drilling rate is evidently due to a cyclic twist or torsional deflection imparted to the formation once each cycle of bit vibration, the formation thus being placed in periodic shear stress. It can apparently involve a complex resultant stress, fluctuating at sonic frequency, and having a geometric orientation which is a complex vector addition of longitudinal and torsional forces. The blades of the vertically vibratory bit engage downwardly on the formation, attaining, at some point in the downstroke, a "nonskid" grip thereon. With the blades of the bit also undergoing rotation, the gripped formation is then twisted through a certain angle before the bit has completed its downstroke and then arisen sufficiently to lose its said "grip." When the latter occurs, the elastically twisted formation rotates back. The cycle then repeats itself. Thus the formation is simultaneously elastically stressed both vertically and torsionally. The torsional vibration results in periodic shear; and since earthen formation is relatively weak in shear, fatigue failure thereof is materially hastened. Penetration rate is correspondingly increased.

Since the increase in penetration rate is frequently obtained only in a critical range of bit rotation rates, it is clear that below the critical range, any torsion attained is insufficient to cause the torsional endurance limit to be exceeded, and the formation will withstand this amount of repetitive torsional stress indefinitely without torsional failure. When the torsional endurance limit is exceeded, however, fatigue failure owing to repetitive torsional stress sets in, and accelerated failure of the formation under the combined longitudinal and torsional cyclic stressing is then observed. It is possible that the resultant stress due to combined longitudinal and torsional elastic deflection approaches and then exceeds an endurance limit for such combination stressing. In any event, as my field experience has demonstrated, a threshold rate of bit rotation can often be found at which the effect of cyclic torsional elastic deflection acts alone or in concert with the cyclic longitudinal elastic deflection to exceed an endurance limit level of stressing whereat the fatigue failure of the formation is more or less sharply augmented. The desirable effect can be gradually lost as the rate of rotation is further increased, and a plausible explanation is that when the rate of rotation is too great, the blades of the bit lose their grip on the formation, or do not secure a grip, and the blades simply skid over the formation. It is also possible that as rotation rates are too much increased, the blades go into a process of scraping or cutting the formation, which has been proved to be a slower drilling process than that of fatigue failure under vibration.

FIGS. 4–6 show, somewhat diagrammatically, an alternate form of sonic drill with which the combined vertical and torsional vibratory cycle of the invention may be practiced. In this case, a column of drilling liquid, rather than a steel column made up of drill collars, provides the resonant acoustic "circuit."

The drill stem is fragmentarily indicated at 13a, and corresponds to the drill stem 13 of FIG. 2, ground surface rotary table and other equipment such as explained in connection with FIG. 2 being understood. The drill stem 13a has a screw thread coupling at 30 into the reduced upper portion 31 of a tubular housing 32. Below the reduced portion 31, housing 32 flares outwardly, as at 33, to a larger diameter portion 34, which extends downwardly some distance to the location of the bit 35, which is a bladed or drag bit. The shank 36 of the bit is received within the lower end portion of housing 32, and arranged for longitudinal motion therewithin, but keyed against rotation relative thereto, as by the splined connection designated at 37. Set into the bit shank 36, around its circulation passage 38, is an upstanding sleeve 39, and threaded on the upper end of the latter is a ring 40 which, while the bit is being lowered into the drill hole, engages and is supported by studs 41 set into the side of housing 32. This provision is merely to prevent the bit from falling out of the housing when the bit is not on bottom. When the bit is on bottom, the ring 40 is spaced above studs 41, as in the position shown in FIG. 4. The bit is shown with usual liquid discharge passages 38a leading from the aforementioned passage 38.

A rotating distributor 42 for circulation liquid, of generally cylindrical form, is rotatably fitted inside housing portion 31, and has a downwardly projecting shaft 43 received in a bearing 44 which is set into a body 45 secured, as by welding to the inside surface of one side of the flared wall portion 33 of housing 32. The upper end of the distributor or rotor 42 is spaced just below the lower drill stem coupling, and the rotor has a bore 46 whose upper end opens through the upper end of the rotor concentrically therewith, so as to receive the liquid flow from the hollow drill stem above. This bore 46 extends both circumferentially of the rotor and radially outward with respect thereto in the downward direction, opening through the lower end of the rotor near its periphery. Liquid passing downwardly through this bore 46, owing to the "twist" in said bore, or the circumferential directional component thereof, causes the rotor to rotate. The rate of rotor rotation will of course depend upon the rate of flow of circulation liquid through the system, and may be controlled by the usual circulation pump at the ground surface.

The body 45 has a substantially semi-cylindrical upwardly opening mouth 50, defined on one side by a wall or web 51 extending across the diameter of housing portion 31, and on its other side by the semi-cylindric surface of housing portion 31 to one side of web 51. The web 51 has at the center a cylindrical cup 52 for the aforementioned bearing 44.

Mouth 50 leads to a downwardly converging body passage 54, which is continued downwardly by a conduit 55 set tightly at its upper end into the lower portion of body 45, and which extends downwardly through housing 32, with a bend therein so as to be in a concentric position within said housing for the greater part of its length. This conduit is received within ring 40 and sleeve 39, and discharges liquid into bit passage 38, all as clearly shown in FIG. 4.

It will be seen that the mouth 50 leading to conduit 55 occupies substantially half of the cross sectional area of housing portion 31, and that an open passage 56 leading downwardly in housing 32 outside body 45 occupies substantially the opposite half of said housing portion. It will also be seen that liquid discharge end of rotor passage 46 will alternately be located over mouth 50 and passage 56. The liquid entering mouth 50 flows down conduit 55 to the bit, and is discharged through bit passages 38a.

The liquid entering passage 56 fills the housing 32 outside body 45 and conduit 55 down to the level of the upper end of the bit, and provides a liquid column 60 therein. This liquid slowly leaks out at the bottom between the splines 37 and between conduit 55 and sleeve 39, and in operation, passage 56 accepts only sufficient liquid from the distributor to replenish or compensate for this leakage flow. Assuming, therefore, a constantly filled housing 32, the effect of the liquid column in distributor passage 46 and the drill stem above, when the lower end of the distributor passage moves over passage 56, is to exert a compressive pressure pulse on the upper end of liquid column 60. While the distributor is discharging directly to mouth 50, the pressure on the upper end of column 60 is relieved. Accordingly, the upper end of liquid column 60 is subjected to a periodic pressure pulse, at a frequency determined by the rate of rotation of the distributor, and in turn by the rate at which liquid is pumped down the drill stem from the circulation pump at the ground surface.

The length of the apparatus is made such that the liquid column 60 has a height equal to $$\frac{(2n-1)\lambda}{4}$$

$n$ being any integer, and $\lambda$ being a wavelength distance measured in the circulation liquid for a sound wave of frequency $f$, where $f$ is also the rate of rotation of the distributor in revolutions per second. A wavelength distance in water at a frequency of 100 cycles per second is approximately 48 feet (the velocity of sound in water being approximately 4,800 feet per second), and taking $n$ as 1, the liquid column 60 would be 12 feet (one quarter wavelength) in height. It will be seen that for $n$ equal to 2, 3, 4, etc., the column height would be ¾ wavelength, 5/4 wave length, 7/4 wavelength, etc. The column height may thus be any odd number of quarter wavelengths. Of course, the above example, i.e., a 12-foot quarter wavelength column, holds good only for water. In general, the circulation liquid will be a mud fluid, for which the velocity of sound would be typically 3600 feet per second. With this medium the above example would have a wavelength of 36 feet, and thus the column would be odd multiples of 9 feet.

Assuming now the typical case of a liquid column 60 which is a quarter wavelength in height for the frequency of revolution of the distributor 42, one compressive displacement pulse is exerted on the upper end of the liquid column 60 per cycle, and a resonant quarter wavelength standing wave is thereby set up in the liquid column. The oscillatory region at the upper end of the column becomes a velocity antinode of this standing wave, and the lower end of the column, adjacent the vibratory bit (which is assumed to be in engagement with the formation), becomes a pressure antinode of the standing wave. The bit end of the liquid column, and the bit, thus experiences vertical force oscillations, in response to the pulses applied to the upper end of the column. In this action, the liquid column 60 alternately elastically elongates and contracts, its upper end undergoing high velocity oscillations, and its lower end, together wtih the bit, undergoing primarily vertical force fluctuations. The force with which this bit oscillation or vibration takes place is fairly high, and, under optimized conditions, will give a practical drilling rate.

The spline connection at 37 between the bit and housing 32 enable vibration of the bit relative to the housing 32, and also causes rotation of the bit when the drill stem and housing 32 are rotated.

It will be understood that the sonic drill of FIGS. 4–6 can be used to carry out the invention in the same manner as described in connection with the drill of FIGS. 1–3. Added weight on bottom can be accomplished by use of drill collars between the drill stem and sonic drill, so that greater pressure can be maintained in column 60. Element 36 above the bit can be of sufficient length so that it too is resonant at the operating frequency, as a resonant elastic bar, thus augmenting the bit action.

FIG. 7 shows a modification of the drill of FIGS. 4–6, according to which the bit 35a is tightly fitted to the lower end of the tubular housing 32a, and the splines shown at 37 in FIG. 4 are omitted. Also, no provisions corresponding to the ring 40 and the studs 41 shown in FIG. 4 are here necessary. In this case, the tubular housing 32a is somewhat flexible and elastic, and simply elastically elongates and contracts in response to elastic elongation and contraction of the contained liquid column. If desired element 39 may be made to grip pipe 55 tightly, thus eliminating the leakage at the lower end, in a system wherein 55 elongates and contracts in step with 32. Here again the shank of the bit 35 can be of sufficient length so as to comprise an elastically resonant bar.

In FIG. 8 is shown the lower end portion of a type of bit that can be substituted for the bladed type bit of FIGS. 3, 4 and 7 for the purpose of some formation types. In this case, the bit comprises simply a cylinder 65, with a bevelled lower edge portion 66 which is engageable with the formation, and through which the formation is vibrated vertically, and elastically twisted. For better grip on the formation, the bevelled portion 66 of the bit may be indented, as at 68, so as to form teeth or serrations 69.

It is to be understood that the apparatus and process of the invention may be employed with various types of sonic drilling equipment, including various types of bit. Several forms of sonic drill and bit have been disclosed herein, but for illustrative purposes only, and no limitation thereto is to be implied.

I claim:

1. The method of drilling, using a sonic drill having a bit vibrated in the direction of the medium to be drilled by an elastic column suspended by a drill string and undergoing resonant elastic longitudinal standing wave vibration, that comprises: maintaining the bit with bias force against the medium to be drilled, effecting vibration of the bit by causing longitudinal standing wave vibration of said column and simultaneously therewith rotating the bit at an angular velocity that improves the drilling rate.

2. The method of claim 1, wherein said bias force is no less than that which causes the appearance of second harmonic frequency in said elastic column.

3. The method of claim 1 wherein said drill is rotated in one direction during more than one full cycle of said vibration.

4. The method of claim 1 in which the drilling rate is optimized by rotating the bit at an angular velocity which is on the order of two revolutions per second.

5. The method of sonic earth drilling, that comprises: forcing a drill bit against the earthen formation with a predetermined biasing force, vertically vibrating the biased bit against the formation by generating an elastic standing wave in a column coupled thereto, and simultaneously therewith steadily and unidirectionally rotating the bit at a rate of rotation wherein the bit engages the formation on each downstroke thereof, and thereafter before releasing its engagement therefrom, exerts a torque on the formation sufficient to materially increase the rate of drilling of the formation above that accomplished by said vibration alone.

6. In a sonic earth bore drilling system the combination of: a massive elongated elastic column capable of longitudinal resonant standing wave vibration, a vibratory drive means coupled to said column for generating said vibration therein, said drive means being operable at a resonant frequency of said column, an earth bore cutting means biased in the direction of drilling and drivingly coupled to one end of said column to receive vibratory impulses therefrom, which impulses in turn are delivered to the material being drilled, and means to improve the drilling rate of said cutting means comprising mechanism to rotate said cutting means so as to rotate said bit about an axis substantially normal to the surface being drilled.

7. The apparatus of claim 6 including a feeding mechanism for controlling the bias force with which said cutting means is urged against the material being drilled.

8. The apparatus of claim 6 wherein said earth bore cutting means has a work engaging edge extending circumferentially around at least a substantial portion of a periphery of said earth bore cutting means.

9. The apparatus of claim 6 wherein said earth bore cutting means has a toothed work engaging edge extending circumferentially around at least a substantial portion of a periphery of said earth bore cutting means.

10. In a sonic earth bore drilling system as defined in claim 6, said massive elongated elastic column being substantially vertical so that its mass applies said bias to said earth bore cutting means.

11. An impact drill which includes; a string of drill pipe, a massive elastic column suspended from said drill pipe, a generator of elastic waves connected to said elastic column and operable to generate high energy longitudinal resonant deformation waves therein, a drill bit coupled to said column and adapted to be driven thereby, and rotary drive transmitting means for rotating said drill pipe and said bit to improve the drilling rate of said cut.

12. An impact drill as defined in claim 11 including biasing means for biasing the drill bit in the direction of drilling.

13. The impact drill defined in claim 12, wherein said bias of said biasing means may be adjusted for optimum penetration rate in the particular formation.

14. An impact drill as defined in claim 12 in which said biasing means comprises said massive elastic column positioned substantially vertically to thus apply biasing force to said drill bit.

15. An impact drill which includes: a substantially solid elastic bar capable of transmitting successive elastic deformation waves of compression and tension longitudinally therealong with the speed of sound for the material of the bar, a bit drivingly coupled to said bar, and an elastic wave generator coupled to said bar for generating the longitudinal elastic deformation waves in said bar and whose frequency is substantially a resonant frequency of the bar establishing a standing wave along the bar characterized by cyclic contraction and elongation of adjacent longitudinal sections of the bar, said bit being drivingly coupled to a longitudinally movable point of one of said elastically contracting and elongating sections of the bar, and wherein the elastic bar is lowered in a well bore by means of a drill pipe, and including rotary drive transmitting means for rotating said pipe during drilling to thus rotate the bit and improve rate of drilling.

16. An impact drill as defined in claim 15 in which said elastic bar comprises means for transmitting biasing force to the bit.

17. The method of sonic earth drilling, that comprises: forcing a drilling bit against the formation with a predetermined biasing force, vertically driving the bit downward, so as to engage and grip the formation, rotating the bit while so engaged and gripped with the formation, so as to elastically torsionally deform a portion of the formation under the bit, and then elevating the bit, so as to release the torsionally elastically deformed portion of the formation and permit it to rotate in reverse direction solely by reason of torsional stress set up in the formation by said torsional elastic deformation thereof.

18. The method of drilling a well bore, using a sonic drill having a bit vibrated in the direction of the medium to be drilled by a massive elastic drill collar suspended in the well bore by a drill pipe string and undergoing resonant elastic longitudinal standing wave vibration, that comprises: maintaining the bit with a downward bias force against the formation under it, at the bottom of the well bore, effecting vertical vibration of the bit against said formation by effecting longitudinal elastic standing wave vibration of said drill collar, such that the bit periodically engages and grips said formation, and rotating the drill pipe string, collar and bit at a speed related to the vibration frequency of the collar and bit such that the formation under the bit engaged and gripped on each downstroke of the bit is torsionally elastically deformed through a substantial angle during engagement and gripping by the bit, and then released by the elevating bit to rotate in reverse direction solely by reason of torsional stress set up in the formation by said torsional elastic deformation thereof.

(References on following page)

References Cited by the Examiner

UNITED STATES PATENTS

| | | | |
|---|---|---|---|
| 1,559,709 | 11/25 | Knapp | 175—56 |
| 1,966,446 | 7/34 | Hayes | 175—56 |
| 2,103,137 | 12/37 | Basgan | 175—56 |
| 2,420,793 | 5/47 | O'Connor | 175—55 X |
| 2,495,364 | 1/50 | Clapp | 175—299 X |
| 2,554,005 | 5/51 | Bodine | 175—55 |
| 2,717,763 | 9/55 | Bodine | 175—55 |
| 2,803,433 | 8/57 | Smith | 175—56 |
| 2,911,192 | 11/59 | Boucher | 175—56 |

FOREIGN PATENTS 740,468   11/55   Great Britain.

CHARLES E. O'CONNELL, *Primary Examiner.*

NORMAN YUDOFF, *Examiner.*

UNITED STATES PATENT OFFICE
CERTIFICATE OF CORRECTION

Patent No. 3,211,243                                        October 12, 1965

Albert G. Bodine, Jr.

It is hereby certified that error appears in the above numbered patent requiring correction and that the said Letters Patent should read as corrected below.

Column 1, line 27, for "later" read -- latter --; column 3, lines 74 and 75, for "extending table 10" read -- extending through table 10 --; column 4, line 3, for "is" read -- as --; column 5, line 24, for "junction" read -- juncture --; column 9, line 65, for "said bit about" read -- said cutting means about --; column 10, line 14, for "cut" read -- bit --; line 41, for "improve rate" read -- improve the rate --.

Signed and sealed this 24th day of May 1966.

(SEAL)
Attest:

ERNEST W. SWIDER                                    EDWARD J. BRENNER
Attesting Officer                                         Commissioner of Patents